(12) United States Patent
Felts et al.

(10) Patent No.: US 10,894,243 B2
(45) Date of Patent: Jan. 19, 2021

(54) METHOD AND DEVICE FOR QUANTITATIVE CONTROL OF FORCE IN MECHANOCHEMICAL REACTIONS

(71) Applicant: The Texas A&M University System, College Station, TX (US)

(72) Inventors: Jonathan R. Felts, College Station, TX (US); James D. Batteas, College Station, TX (US); Shivaranjan Raghuraman, College Station, TX (US); Thomas Reyes, Bryan, TX (US)

(73) Assignee: The Texas A & M University System, College Station, TX (US)

( * ) Notice: Subject to any disclaimer, the term of this patent is extended or adjusted under 35 U.S.C. 154(b) by 0 days.

(21) Appl. No.: 16/789,643

(22) Filed: Feb. 13, 2020

(65) Prior Publication Data

US 2020/0261882 A1    Aug. 20, 2020

Related U.S. Application Data

(60) Provisional application No. 62/806,376, filed on Feb. 15, 2019.

(51) Int. Cl.
*B01J 19/00* (2006.01)
*B01J 19/18* (2006.01)
*B01J 19/24* (2006.01)
*B02C 1/00* (2006.01)

(52) U.S. Cl.
CPC ........... *B01J 19/18* (2013.01); *B01J 19/0013* (2013.01); *B02C 1/00* (2013.01); *B01J 2219/00063* (2013.01); *B01J 2219/00162* (2013.01)

(58) Field of Classification Search
CPC .... B01J 19/00; B01J 19/0006; B01J 19/0013; B01J 19/18; B01J 19/24; B01J 2219/00; B01J 2219/00049; B01J 2219/00051; B01J 2219/00054; B01J 2219/00056; B01J 2219/00058; B01J 2219/00063; B01J 2219/00162; B02C 1/00
See application file for complete search history.

(56) References Cited

U.S. PATENT DOCUMENTS

| | | | |
|---|---|---|---|
| 6,455,316 B1 | 9/2002 | Turner et al. | |
| 6,880,771 B2 * | 4/2005 | Deppermann | B02C 17/10 241/175 |
| 2002/0072827 A1 | 6/2002 | Sentmanat | |
| 2006/0260413 A1 | 11/2006 | Kraemer et al. | |
| 2013/0284838 A1 | 10/2013 | Matteazzi | |

FOREIGN PATENT DOCUMENTS

GB             387733 A      2/1933

* cited by examiner

*Primary Examiner* — Natasha E Young
(74) *Attorney, Agent, or Firm* — Winstead PC (57) ABSTRACT

A mechanochemical reactor includes an outer shell. A first plate is slidably disposed within the tubular outer shell at a first end of the tubular outer shell and a second plate is slidably disposed within the tubular outer shell at a second end of the tubular outer shell, the second end being opposite the first end. A linearly-reciprocating mill is disposed within the tubular outer shell between the first plate and the second plate. A first electromagnet is operatively coupled to the first plate so as to establish a position and a holding force of the first plate within the tubular outer shell, and a second electromagnet is operatively coupled to the second plate so as to establish a position and a holding force of the second plate within the tubular outer shell.

20 Claims, 8 Drawing Sheets

METHOD AND DEVICE FOR QUANTITATIVE CONTROL OF FORCE IN MECHANOCHEMICAL REACTIONS

CROSS-REFERENCE TO RELATED APPLICATIONS

This patent application claims priority to, and incorporates by reference the entire disclosure of, U.S. Provisional Patent Application No. 62/806,376, filed on Feb. 15, 2019.

TECHNICAL FIELD

The present disclosure relates generally to mechanochemical reactions and more particularly, but not by way of limitation to a linearly reciprocating mill that facilitates quantitative control of force in mechanochemical reactions.

BACKGROUND

Mechanochemistry represents an interface between chemistry and mechanical engineering and involves examination of mechanical and chemical processes on a molecular level. Using principles of mechanochemistry, it is possible to synthesize chemical products through the use of mechanical processes such as, for example, the application of force. Ball milling, in particular, is a process in which a mechanical force is utilized to initiate chemical reactions. Grinding is another mechanical process utilized to synthesize chemical products. While these mechanical processes are effective for initiating and furthering chemical reactions, it is often difficult to quantify the force exerted on the reactants as well as the reaction rates of the reactants.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

Aspects of the disclosure relate to a mechanochemical reactor. The mechanochemical reactor includes an outer shell. A first plate is slidably disposed within the tubular outer shell at a first end of the tubular outer shell and a second plate is slidably disposed within the tubular outer shell at a second end of the tubular outer shell, the second end being opposite the first end. A linearly-reciprocating mill is disposed within the tubular outer shell between the first plate and the second plate. A first electromagnet is operatively coupled to the first plate so as to establish a position and a holding force of the first plate within the tubular outer shell, and a second electromagnet is operatively coupled to the second plate so as to establish a position and a holding force of the second plate within the tubular outer shell.

Aspects of the disclosure relate to a mechanochemical reactor. The mechanochemical reactor includes an outer shell. A first plate is slidably disposed within the outer shell at a first end of the outer shell and a second plate is slidably disposed within the outer shell at a second end of the outer shell. The second end is opposite the first end. A linearly-reciprocating mill is disposed within the outer shell between the first plate and the second plate. A first force sensor is coupled to the first plate and a second force sensor is coupled to the second plate.

Aspects of the disclosure relate to a method of inducing a mechanochemical reaction. The method includes placing or injecting reactants into a tubular outer shell between a first plate and a second plate. A first electromagnet that is operatively coupled to the first plate is tuned to establish a maximum contact force supported by the first plate. A second electromagnet that is operatively coupled to the second plate is tuned to establish a maximum contact force supported by the second plate. The first plate and the second plate are coupled to each other in order to maintain a fixed distance between the first plate and the second plate. A mill is reciprocated in a linear fashion between the first plate and the second plate. A contact force is measured between the mill and at least one of the first plate and the second plate sufficient to induce a chemical reaction between the reactants.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

One challenge that limits broad application of mechanochemical syntheses is an inability to control a force vector that is applied to the chemical reactants. Such a scenario makes it nearly impossible to determine how the magnitude, direction, and duration of applied mechanical load correlates to the kinetics and thermodynamics of the associated chemical reactions. The lack of control over the applied mechanical load significantly hinders the ability to understand, predict, and control the formation of desired chemical products. Aspects of the disclosure relate to a design of a mechanochemical reactor that provides control over the forces applied to the chemical reactants, providing a way to explore how force drives the formation of chemical products. This force-controlled mechanochemical reactor will allow for long-term exploration of mechanochemical synthesis of a broad range of materials including but not limited to organic and inorganic compounds, polymers, friction modifiers and pharmaceuticals where in-situ synthesis is known to be controlled by shear forces, but the formation mechanisms are still not well understood.

Figure 1:
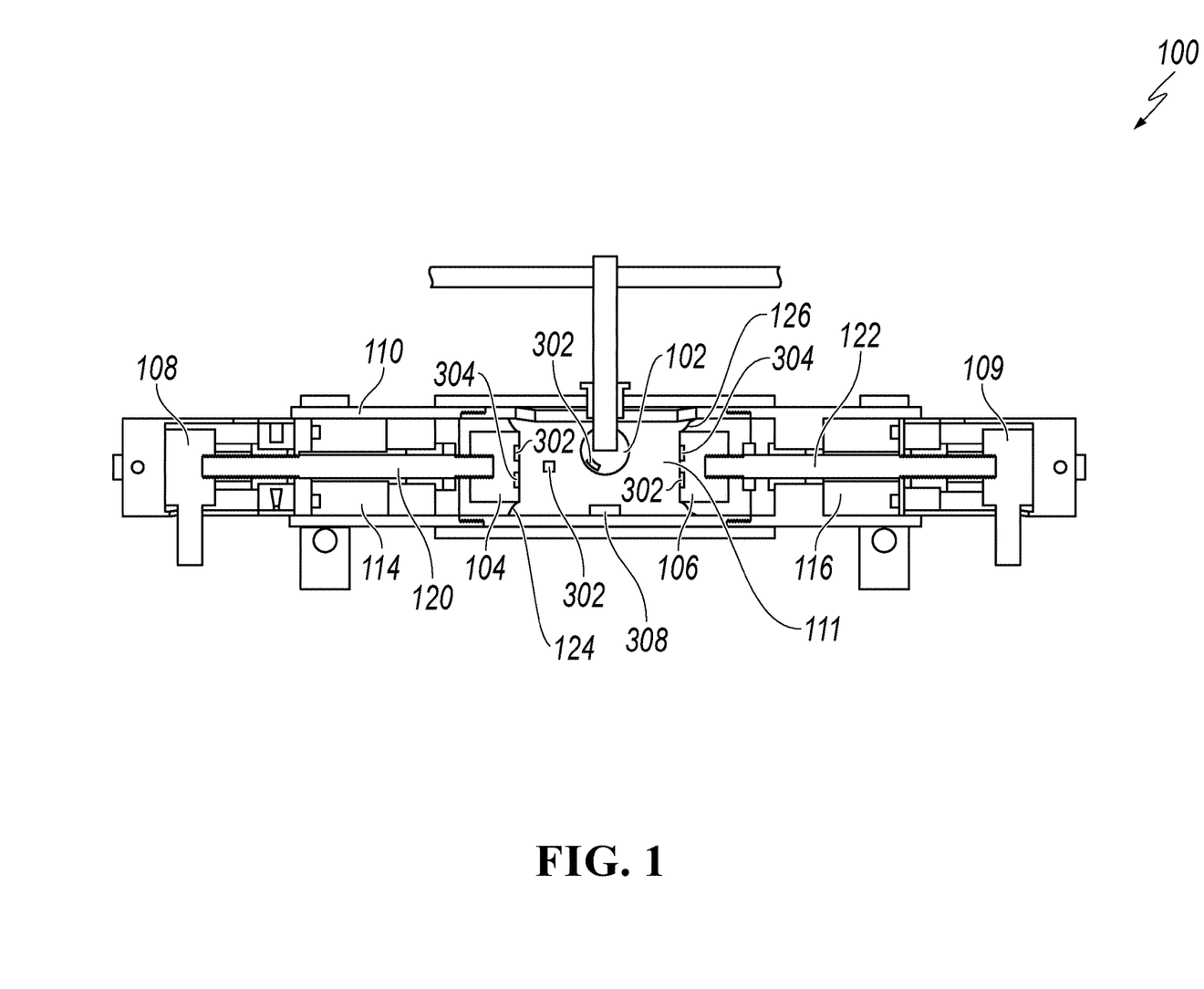
FIG. 1 is a side cross-sectional view of a mechanochemical reactor according to aspects of the disclosure.
Figure 2:
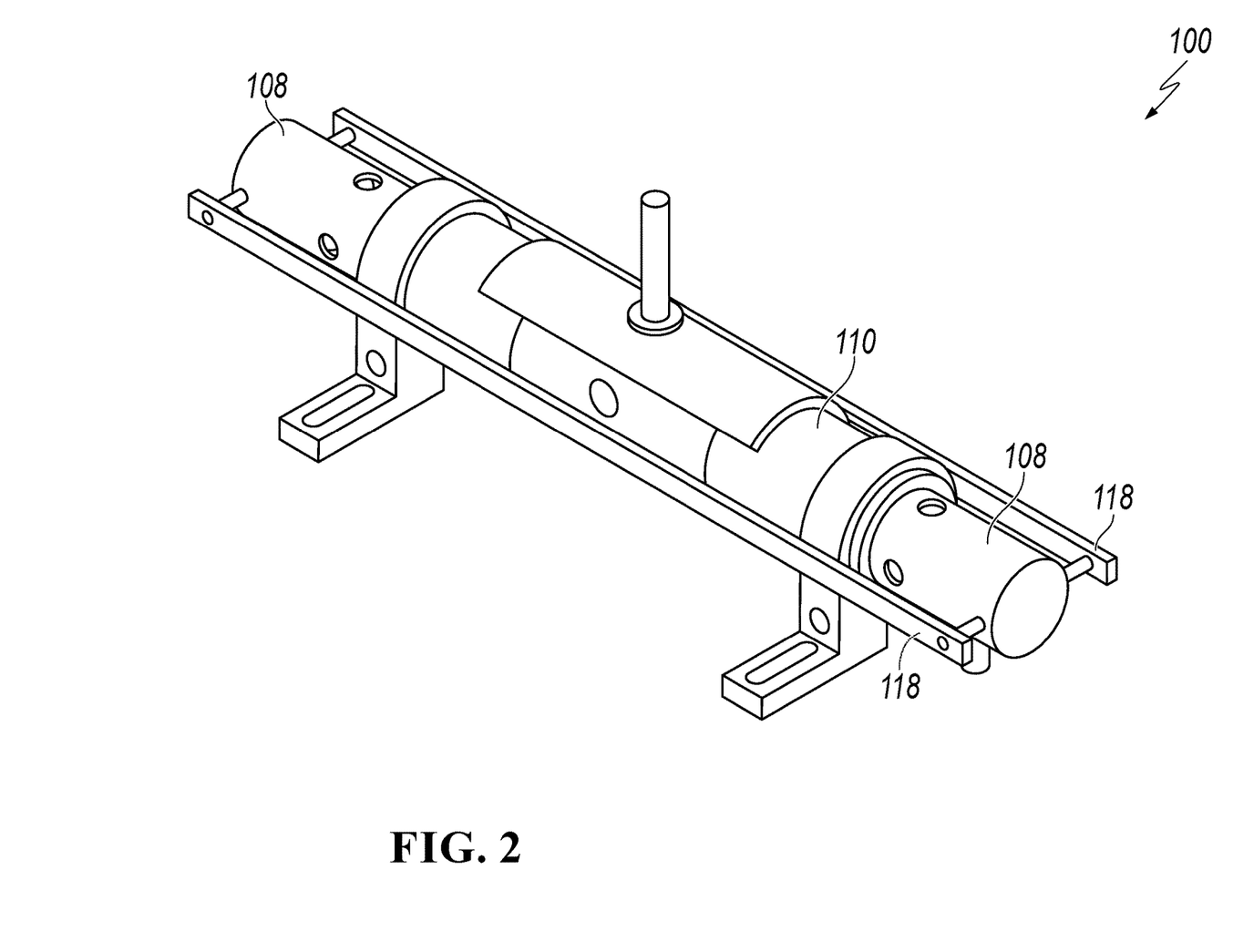
FIG. 2 is a top cross-sectional view of the mechanochemical reactor of FIG. 1.

FIG. 1 is a side cross-sectional view of the mechanochemical reactor 100. FIG. 2 is a perspective view of the mechanochemical reactor 100. Referring to FIGS. 1-2 collectively, the mechanochemical reactor 100 includes an outer shell 110 having an interior space 111 defined therein. A first plate 104 and a second plate 106 are disposed within the interior space 111 of the outer shell 110. The outer shell 110 is illustrated by way of example as having a generally cylindrical tubular shape; however, in other embodiments, other shapes could be utilized. A first connecting rod 120 connects the first plate 104 with a first force sensor. A second connecting rod 122 connects the second plate 106 with a second force sensor 109. A first electromagnet 114 is disposed between the first plate 104 and the first force sensor 108 and a second electromagnet is disposed between the second plate 106 and the second force sensor 109.

Figure 7:
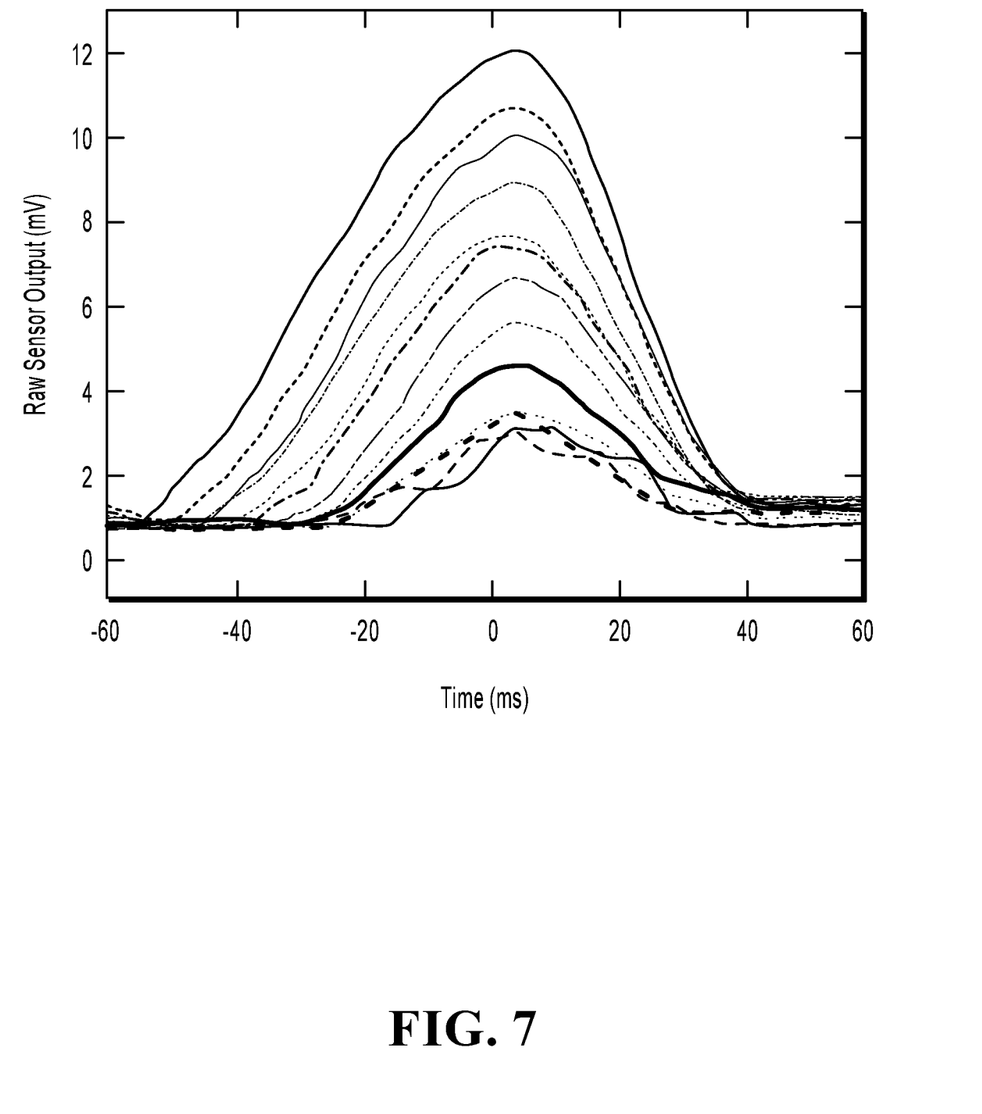
FIG. 7 is a plot of force-sensor output over time.
Figure 8:
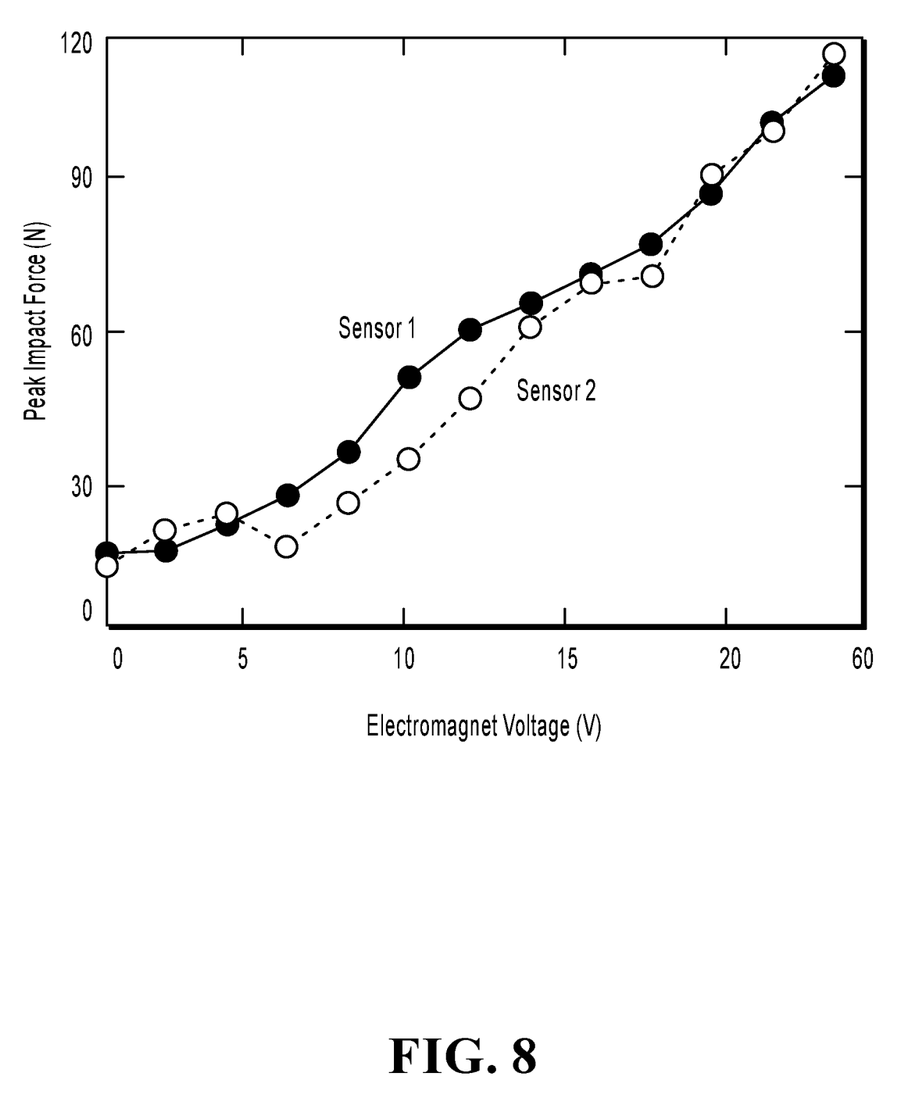
FIG. 8 is a plot showing the variation of electromagnetic voltage produced by the force sensor as a function of impact force.

Still referring to FIGS. 1-2, a mill 102 travels in a linear fashion between the first plate 104 and the second plate 106 within the outer shell 110. In various embodiments, the mill 102 is a metal or ceramic ball (e.g. standard stainless steel or zirconia balls used in commercial ball milling systems); however, in other embodiments, other shapes could be utilized. The first force sensor 108 and the second force sensor 109 are, for example, high-impact force sensors. In various embodiments, the first force sensor 108 and the second force sensor 109 may be, for example, strain-based force sensors having a deformation element. During impact of the mill 102 with the first plate 104, the impact force is transmitted along the first connecting rod 120 to the first force sensor 108. The impact force causes mechanical deformation of the deformation element. Such deformation produces an electromagnetic voltage in an amount proportional to the magnitude of the impact force. In similar fashion, when the mill 102 strikes the second plate 106, the impact force is transmitted to the second force sensor 109 via the second connecting rod 122. The second force sensor 109 measures a magnitude of the impact force in a manner similar to that described above with respect to the first force sensor 108. Variation of the electromagnetic voltage produced by the first force sensor 108 and the second force sensor 109 as a function of impact time is illustrated in FIG. 7. Variation of the electromagnetic voltage produced by the first force sensor 108 and the second force sensor 109 as a function of impact force is illustrated in FIG. 8. Although, the first force sensor 108 and the second force sensor 109 have been described herein as being strain-based force sensors, one of skill in the art will recognize that the first force sensor 108 and the second force sensor 109 could, in other embodiments, include accelerometers, inertial measurement units, or any other type of force sensor.

Figure 3:
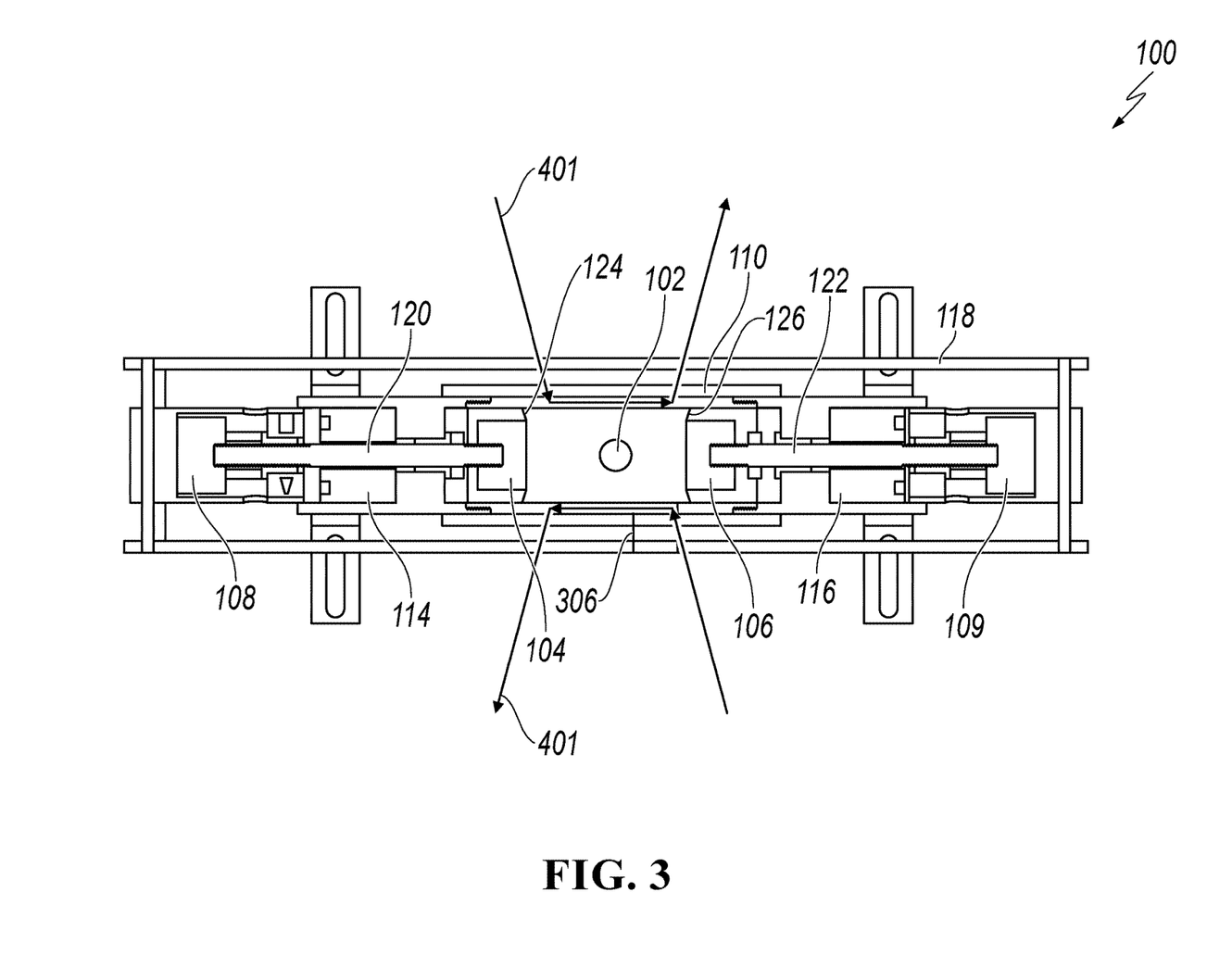
FIG. 3 is a perspective view of the mechanochemical reactor of FIG. 1.
Figure 4:
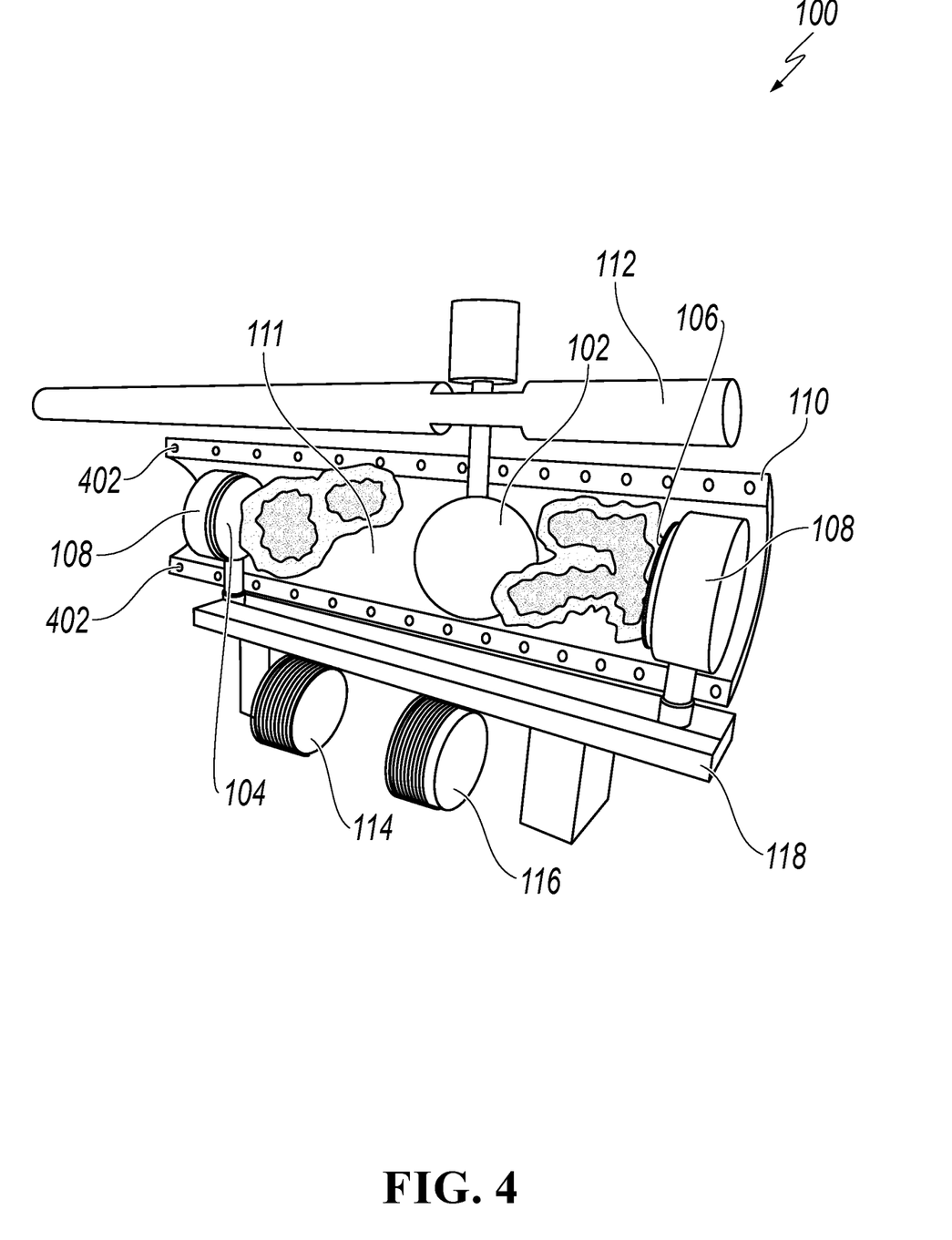
FIG. 4 is a perspective cross-sectional diagram of a mechanochemical reactor according to aspects of the disclosure.

FIG. 3 is a top cross-sectional view of the mechanochemical reactor 100. FIG. 4 is a perspective cross-sectional diagram of a mechanochemical reactor 100. Referring to FIGS. 3-4, the first plate 104 and the second plate 106 are disposed at opposite ends of the outer shell 110. The mill 102 is mounted to a freely rotating shaft 112, which is powered, for example, by an axial motor, providing linear movement to the mill 102. Reciprocating motion causes the mill 102 to impact the first plate 104 and the second plate 106, which transmits an impact force to the first force sensor 108 and the second force sensor 109, respectively. The first plate 104 and the second plate 106 are held in place by, for example, the first electromagnet 114 and the second electromagnet 116, respectively. In various embodiments, the first electromagnet 114 and the second electromagnet 116 are tunable in order to adjust at least one of a position and a maximum holding force of the first plate 104 and the second plate 106. In various embodiments, the first electromagnet 114 and the second electromagnet 116 may be tuned, for example, by modulating at least one of an electrical voltage or an electrical current supplied to the first electromagnet 114 and the second electromagnet 116.

Still referring to FIGS. 3-4, during operation, the mill 102 reciprocates in a linear fashion between the first plate 104 and the second plate 106. Upon impacting the first plate 104, the first plate 104 decouples from the first electromagnet 114 when the impact force between the mill 102 and the first plate 104 exceeds the magnetic force of attraction between the first plate 104 and the first electromagnet 114. The first plate 104 and the second plate 106 are coupled to each other via, for example, a coupling bar 118. Thus, when the first plate 104 decouples from the first electromagnet 114, the first plate 104 moves towards an end of the outer shell 110. Movement of the first plate 104 towards the end of the outer shell 110 causes the second plate 106 to move towards a center of the outer shell 110 and become coupled to the second electromagnet 116. Upon impacting the second plate 106, the second plate 106 decouples from the second electromagnet 116 when the impact force between the mill 102 and the second plate 106 exceeds the magnetic force of attraction between the second plate 106 and the second electromagnet 116. Movement of the second plate 106 towards an end of the outer shell 110 causes the first plate 104 to move towards the center of the outer shell 110 and become re-coupled to the first electromagnet 114.

Still referring to FIGS. 3-4, a first seal 124 is disposed around an outer perimeter of the first plate 104 and contacts an inner surface of the outer shell 110. A second seal 126 is disposed around a perimeter of the second plate 106 and contacts an inner surface of the outer shell 110. During operation, the first seal 124 and the second seal 126 wipe along the inner surface of the outer shell 110 as the first plate 104 and the second plate 106 move within the outer shell 110. The first seal 124 and the second seal 126 prevent infiltration of reactants around the first plate 104 and the second plate 106 to the first electromagnet 114, the second electromagnet 116, the first force sensor 108, and the second force sensor 109. In various embodiments, the first seal 124 and the second seal 126 are fluoro-polymer o-rings; however, in other embodiments, other types of seals could be utilized.

Referring to FIGS. 1-4 collectively, in various embodiments, the mechanochemical reactor 100 may also include at least one temperature sensor 302 located within the mechanochemical reactor 100. In such embodiments, the at least one temperature sensor 302 may include a plurality of temperature sensors located, for example, in the mill 102, in the first plate 104 and the second plate 106, and in an interior wall of the outer shell 110. In various embodiments, the at least one temperature sensor 302 may be, for example, a thermometer, a thermocouple, an infra-red temperature sensor, or any other type of temperature sensor. During operation, the at least one temperature sensor 302 facilitates measurement of a reaction temperature during completion of a chemical reaction.

Still referring to FIGS. 1-4, in various embodiments, the mechanochemical reactor 100 may include a mechanical shear sensor 304 disposed therein. For example, in various embodiments, the mechanical shear sensor 304 may be disposed on at least one of the first plate 104 and the second plate 106. In such embodiments, the mechanical shear sensor 304 facilitates measurement of a full stress field during each impact of the mill 102 with the first plate 104 and the second plate 106. In various embodiments the shear sensor 304 could be, for example, a diverging micro-pillar shear stress sensor utilizing slender micro-pillars that bend in response applied forces. In various other embodiments, the shear sensors 304 could include an array of strain sensors that are incorporated into at least one of the first plate, 104, the second plate 106, the first connecting rod 120, and the second connecting rod 122. In such an embodiment, the array of strain sensors could be used in concert with beam mechanics theory to convert strain to shear forces on the first plate 104 and the second plate 106. In still other embodiments, the strain sensor 304 could include, for example, at least one of a three-axis gyroscope or an array of accelerometers. In still other embodiments, the shear sensor 304 could incorporate micro-electro-mechanical systems (MEMS) for sensing acceleration and shear.

Still referring to FIGS. 1-4, in various embodiments, at least one port 306 is formed through a wall of the outer shell 110 to facilitate the influx and efflux of chemical constituents. In various embodiments, the chemical constituents may include, for example, inert or reactive gases, liquids, or solids and may be reactants or inert. In various embodiments, the chemical constituents may be reactants or inert.

Still referring to FIGS. 1-4, in various embodiments, the mechanochemical reactor 100 may include instruments 308 for measuring spectroscopy of chemical constituents. In various embodiments, the instruments 308 may be located near a bottom interior surface of the outer shell 110 in order to facilitate accumulation of the chemical constituents around the instruments 308. In such embodiments, measurement of spectroscopy facilitates measurement of chemical composition during a chemical reaction including measurement of reaction intermediates. In various embodiments, the instruments could include, for example, instruments for measurement of UV-visible absorption, fluorescence, infrared (IR), or Raman spectroscopy. In situ structural details may also potentially be accomplished by interfacing with an x-ray diffractometer.

Still referring to FIGS. 1-4, in various embodiments, the mechanochemical reactor 100 may include a temperature control system. In various embodiments, the temperature control system may include, for example, a recirculating chiller that circulates a heat-transfer fluid 401 through channels 402 embedded in the interior of the mechanochemical reactor 100. In various embodiments, the temperature control system may be utilized, for example, to selectively heat and cool one or more of, the mill 102, the first plate 104, the second plate 106, and the interior wall of the outer shell 110.

Figure 5:
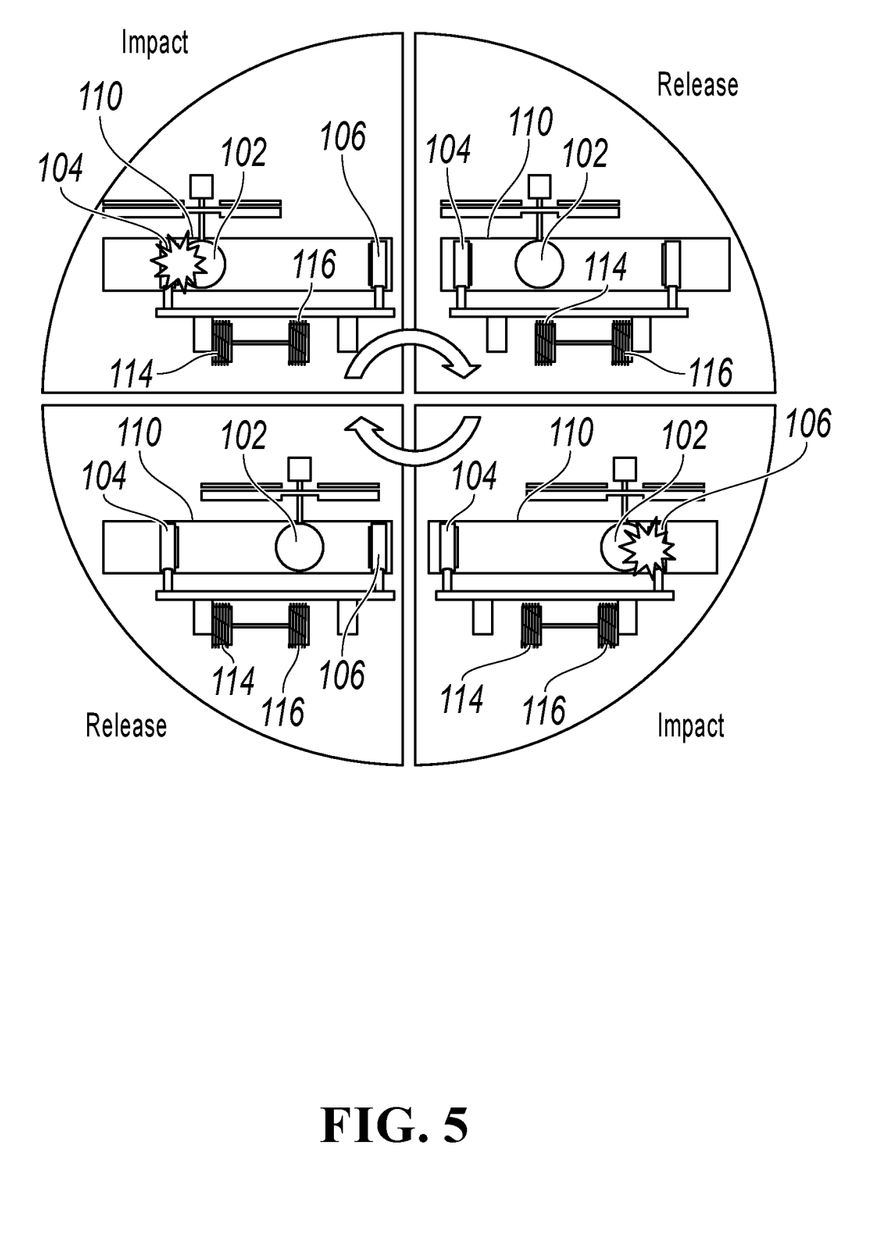
FIG. 5 is a schematic diagram of a reactor cycle of the mechanochemical reactor of FIG. 1.

FIG. 5 is a schematic diagram of a reactor cycle of the mechanochemical reactor 100. During operation, the mill 102 reciprocates in a linear fashion between the first plate 104 and the second plate 106. Upon impacting the first plate 104, the impact force is transmitted via the first connecting rod 120 to the first force sensor 108. When the impact force exceeds the magnetic force of attraction between the first electromagnet 114 and the first force sensor 108, the first force sensor 108 decouples from the first electromagnet 114. The first plate 104 and the second plate 106 are coupled to each other via, for example, a coupling bar 118. Thus, when the first plate 104 decouples from the first electromagnet 114, the first plate 104 moves towards an end of the outer shell 110. Movement of the first plate 104 towards the end of the outer shell 110 causes the second plate 106 to move towards a center of the outer shell 110 and causes the second force sensor 109 to become coupled to the second electromagnet 116. Upon impacting the second plate 106, the impact force is transmitted via the second connecting rod 122 to the second force sensor 109. When the impact force exceeds the magnetic force of attraction between the second electromagnet 116 and the second force sensor 109, the second force sensor 109 decouples from the second electromagnet 116. Movement of the second plate 106 towards an end of the outer shell 110 causes the first plate 104 to move towards the center of the outer shell 110 and causes the first force sensor 108 to become re-coupled to the first electromagnet 114. In various embodiments, the first electromagnet 114 and the second electromagnet may be tunable. That is, the magnetic force of attraction between the first electromagnet 114 and the first force sensor 108 and the magnetic force of attraction between the second electromagnet 116 and the second force sensor 109 may be adjusted in an effort to adjust the maximum holding force of the first plate 104 and the second plate 106.

Figure 6:
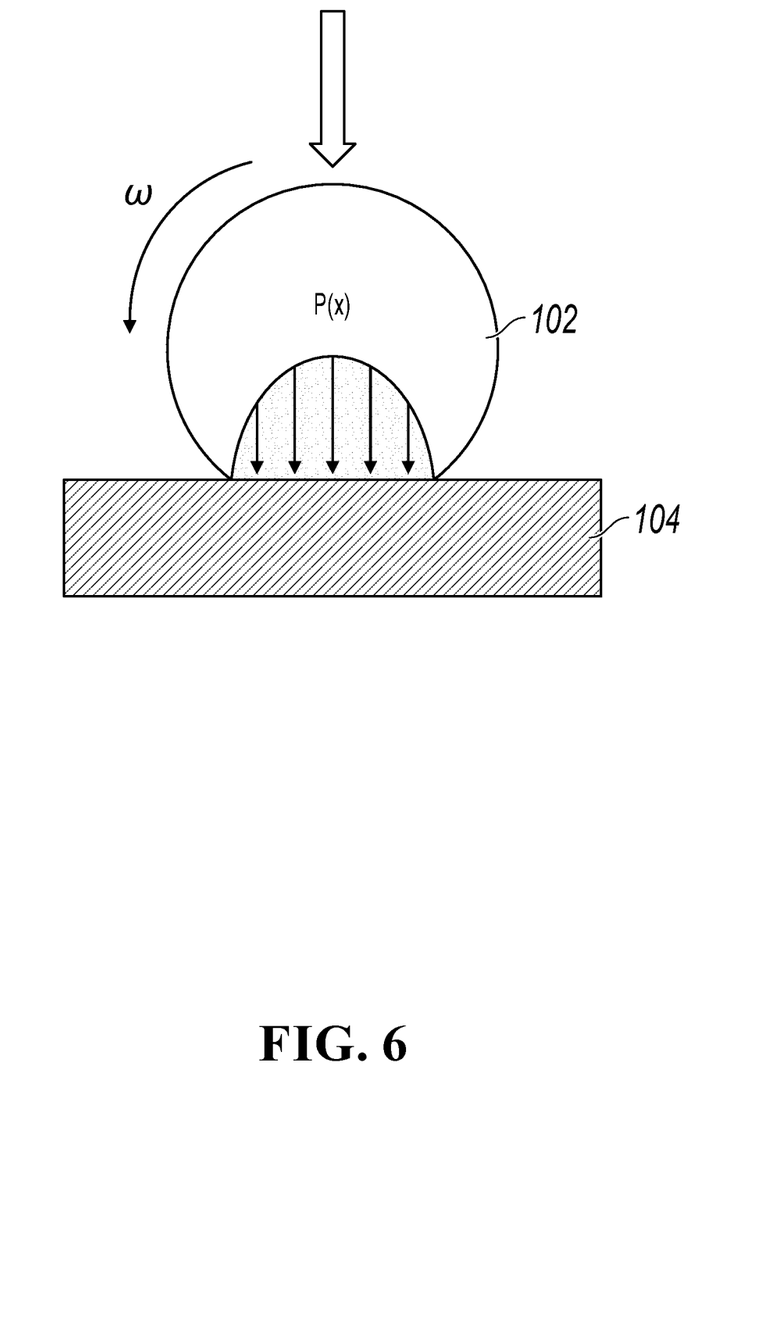
FIG. 6 is a schematic diagram of an impacting ball where both linear and rotational motion creates controllable elastoplastic interactions.

FIG. 6 is a schematic diagram of an impacting mill 102 where both linear and rotational motion creates controllable elastoplastic interactions. In various embodiments, the force exerted onto the reactants at the interface between the mill 102 and first plate 104 and the second plate 106 is a complex function of the elasto-plastic mechanical properties, geometry, and a degree of linear and angular momentum. The maximum impact force at the first force sensor 108 and the second force sensor 109 can be controllably reduced below the yield stress of the material of the mill 102 by tuning the strength of the first electromagnet 114 and the second electromagnet 116, where exceeding the maximum set force causes at least one of the first electromagnet 114 and the second electromagnet 116 to disengage and separates the mill 102 and at least one of the first force sensor 108 and the second force sensor 109. Thus, the combination of rotation speed and impact force provides a method to precisely control the magnitude and direction of the applied forces within the mechanochemical reactor 100. The mechanochemical reactor 100 will facilitate understanding of how the magnitude of the force affects the rate of the chemical reaction under study and how the direction of the applied load relative to the impacting surface matter, and, for cases where multiple reaction products are possible, if the yields for these products sensitive to the magnitude and direction of load. That is, the mechanochemical reactor 100 will facilitate understanding of whether one species can be made by controlling the applied load.

One exemplary application of the mechanochemical reactor 100 is the production of, for example, metal-organic frameworks (MOFs). MOFs are utilized within the petroleum and petrochemical industries, for oil refining, high density gas storage, and separations and catalytic reactions, which are used in the production of hydrocarbon feedstocks for synthetic fuels and polymer production. In various embodiments, MOFs are synthesized in solution-based processes, which require harsh and expensive solvents, leading to waste, environmental and health hazards, and excess cost. Additionally, although one of the strengths of the MOF family of materials is the ability to synthesize a wide range of chemical compositions, precisely controlling these compositions is often not straightforward, further increasing complexity and cost. Mechanochemistry—driving chemical reactions through the application of force—provides an additional route for producing a wide range of chemical compounds that require little or no solvents, is inherently scalable, and can lead to products that are otherwise not synthetically possible through other approaches.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A mechanochemical reactor, comprising:
   an outer shell;
   a first plate slidably disposed within the outer shell at a first end of the outer shell;
   a second plate slidably disposed within the outer shell at a second end of the outer shell, the second end being opposite the first end;
   a linearly-reciprocating mill disposed within the outer shell between the first plate and the second plate;
   a first electromagnet operatively coupled to the first plate so as to establish a position of the first plate within the outer shell; and
   a second electromagnet operatively coupled to the second plate so as to establish a position of the second plate within the outer shell.

2. The mechanochemical reactor of claim 1, wherein the first electromagnet and the second electromagnet are tunable so as to establish a maximum impact force supported by the first plate and the second plate, respectively.

3. The mechanochemical reactor of claim 1, wherein the mill comprises a ball shape.

4. The mechanochemical reactor of claim 1, further comprising:
   a first force sensor coupled to the first plate; and
   a second force sensor coupled to the second plate.

5. The mechanochemical reactor of claim 4, comprising:
   a first connecting rod that couples the first plate to the first force sensor; and
   a second connecting rod that couples the second plate to the second force sensor.

6. The mechanochemical reactor of claim 4, wherein the first force sensor and the second force sensor are strain-based force sensors.

7. The mechanochemical reactor of claim 1, comprising:
   a first seal disposed around the first plate and contacting an inner face of the outer shell; and
   a second seal disposed around the second plate and contacting the inner face of the outer shell.

8. The mechanochemical reactor of claim 7, wherein the first seal and the second seal are fluoro-polymer o-rings.

9. The mechanochemical reactor of claim 1, wherein the mill is operatively coupled to a linearly-reciprocating rocker bar.

10. The mechanochemical reactor of claim 1, further comprising a temperature sensor disposed in the outer shell.

11. The mechanochemical reactor of claim 1, wherein the outer shell is tubular.

12. A mechanochemical reactor, comprising:
   an outer shell;
   a first plate slidably disposed within the outer shell at a first end of the outer shell;
   a second plate slidably disposed within the outer shell at a second end of the outer shell, the second end being opposite the first end;
   a linearly-reciprocating mill disposed within the outer shell between the first plate and the second plate;
   a first force sensor coupled to the first plate; and
   a second force sensor coupled to the second plate.

13. The mechanochemical reactor of claim 12, further comprising a temperature sensor.

14. The mechanochemical reactor of claim 13, wherein the temperature sensor is disposed in at least one of the linearly-reciprocating mill, the first plate, the second plate, or an inner surface of the outer shell.

15. The mechanochemical reactor of claim 12, further comprising a shear sensor disposed in at least one of the first plate and the second plate.

16. The mechanochemical reactor of claim 12, further comprising spectroscopy instruments disposed in a bottom interior aspect of the outer shell.

17. The mechanochemical reactor of claim 12, further comprising a port formed in the outer shell for introduction of chemical constituents.

18. A method of inducing a mechanochemical reaction, the method comprising:
   injecting reactants into a tubular outer shell between a first plate and a second plate;
   tuning a first electromagnet that is operatively coupled to the first plate to establish a maximum contact force supported by the first plate;
   tuning a second electromagnet that is operatively coupled to the second plate to establish a maximum contact force supported by the second plate;
   reciprocating a mill in a linear fashion between the first plate and the second plate; and
   measuring a contact force between the mill and at least one of the first plate and the second plate sufficient to induce a chemical reaction between the reactants.

19. The method of claim 18, wherein the injecting comprises utilizing a port formed in the tubular outer shell.

20. The method of claim 18, comprising measuring at least one of temperature, shear, spectroscopy, and X-ray diffraction during the chemical reaction between the reactants.

* * * * *